United States Patent
Jeong et al.

(10) Patent No.: US 11,757,113 B2
(45) Date of Patent: Sep. 12, 2023

(54) METHOD AND SYSTEM FOR CORRECTING OFFSET OF HYDROGEN PRESSURE SENSOR

(71) Applicants: HYUNDAI MOTOR COMPANY, Seoul (KR); KIA CORPORATION, Seoul (KR)

(72) Inventors: Seong Cheol Jeong, Suwon-si (KR); Jong Gyun Kim, Yongin-si (KR); Jun Young Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 9 days.

(21) Appl. No.: 17/462,669

(22) Filed: Aug. 31, 2021

(65) Prior Publication Data

US 2022/0190366 A1    Jun. 16, 2022

(30) Foreign Application Priority Data

Dec. 14, 2020   (KR) .......................... 10-2020-0174587

(51) Int. Cl.
| | | |
|---|---|---|
| *H01M 8/04537* | (2016.01) | |
| *H01M 8/04746* | (2016.01) | |
| *H01M 8/0438* | (2016.01) | |
| *H01M 8/04119* | (2016.01) | |
| *G01L 27/00* | (2006.01) | |
| *H01M 8/04302* | (2016.01) | |

(52) U.S. Cl.
CPC ... *H01M 8/04302* (2016.02); *H01M 8/04119* (2013.01); *H01M 8/04559* (2013.01); *H01M 8/04753* (2013.01)

(58) Field of Classification Search
CPC ......... H01M 8/04302; H01M 8/04119; H01M 8/04559; H01M 8/04753; H01M 8/0438; H01M 8/04425; H01M 8/04776; H01M 8/04179; H01M 8/04664; H01M 8/04089; Y02E 60/50; G01L 27/002
USPC ........................................ 429/429
See application file for complete search history.

(56) References Cited

U.S. PATENT DOCUMENTS

2016/0033351 A1*  2/2016  Ban ................. G01L 27/005
                                                                73/1.57
2018/0292284 A1*  10/2018  Kim ................. H01M 8/04388

FOREIGN PATENT DOCUMENTS

KR     2018-0114585 A    10/2018

* cited by examiner

*Primary Examiner* — Christian Roldan
(74) *Attorney, Agent, or Firm* — MCDONNELL BOEHNEN HULBERT & BERGHOFF LLP

(57) ABSTRACT

Provided are a method and system for correcting an offset of a hydrogen pressure sensor. The method includes constantly supplying the hydrogen to the fuel cell stack, determining whether an offset of the hydrogen pressure sensor needs to be corrected based on a stop time before the fuel cell stack starts and a magnitude of an output voltage of the fuel cell stack, calculating an offset correction value when the offset of the hydrogen pressure sensor needs to be corrected, and correcting the offset of the hydrogen pressure sensor and performing the starting of the fuel cell stack.

11 Claims, 3 Drawing Sheets

METHOD AND SYSTEM FOR CORRECTING OFFSET OF HYDROGEN PRESSURE SENSOR

CROSS REFERENCE TO RELATED APPLICATIONS

The present application claims priority to Korean Patent Application No. 10-2020-0174587, filed Dec. 14, 2020, the entire contents of which is incorporated herein for all purposes by this reference.

BACKGROUND

Technical Field

The present disclosure relates to a method and system for correcting an offset of a hydrogen pressure sensor capable of determining a probability of an excessive offset of the hydrogen pressure sensor, such as a long term neglect of the hydrogen pressure sensor upon starting a fuel cell system, calculating the offset of the hydrogen pressure sensor without opening a drain valve upon starting the fuel cell system, satisfying hydrogen emission regulations and eliminating a problem of an excessive starting time, eliminating a risk of occurrence of a reverse voltage upon starting the fuel cell system by applying the calculated offset, improving durability, securing accuracy of hydrogen control by normal starting and operation, and securing stability of the fuel cell system.

Description of the Related Art

Fuel cell systems are being used in various fields due to eco-friendly advantages, ease of hydrogen storage, and a change in an industrial structure. Hydrogen supply control is considered to be an important control in fuel cell system control due to characteristics of the system that basically uses hydrogen as fuel.

Most of the fuel cell systems perform hydrogen electrode pressure control to perform the hydrogen supply control. Assuming that a high concentration of hydrogen is supplied from a hydrogen tank, a hydrogen pressure control method is the most common control method according to the required output and operation conditions. That is, securing the accuracy of the hydrogen electrode pressure sensor is a factor for controlling the hydrogen pressure.

However, all sensors have a phenomenon in which an initial setting value is unintentionally changed with slight differences due to various unavoidable environmental factors such as an offset. In general, it is known that the hydrogen pressure sensor tends to accelerate the phenomenon of occurrence of the offset when the hydrogen pressure sensor is left for a long period of time and as a contact time of the hydrogen pressure sensor with oxygen increases.

When such an offset occurs, if the hydrogen supply control is performed without performing an appropriate offset correction, the stability of the system as well as the control accuracy may not be secured. In order to cope with this phenomenon, an offset correction function is also applied in the related art. However, since the method according to the related art may be performed only when the fuel cell is shut down, it is difficult to expect the effect of the method according to the related art when the fuel cell starts after the hydrogen pressure sensor is substantially left for a long period of time. In addition, a method of opening the drain valve has problems such as hydrogen emission gas regulations and an excessive correction time.

The contents described as the related art have been provided only to assist in understanding the background of the present disclosure and should not be considered as corresponding to the related art known to those having ordinary skill in the art.

SUMMARY

An object of the present disclosure is to provide a method and system for correcting an offset of a hydrogen pressure sensor capable of determining a probability of an excessive offset of the hydrogen pressure sensor such as a long term neglect of the hydrogen pressure sensor upon starting a fuel cell system, calculating the offset of the hydrogen pressure sensor without opening a drain valve upon starting the fuel cell system, satisfying hydrogen emission regulations and eliminating a problem of an excessive starting time, eliminating a risk of occurrence of a reverse voltage upon starting the fuel cell system by applying the calculated offset, improving durability, securing accuracy of hydrogen control by normal starting and operation, and securing stability of the fuel cell system.

According to an embodiment of the present disclosure, a method for correcting an offset of a hydrogen pressure sensor includes checking whether hydrogen is normally supplied to a fuel cell stack, constantly supplying the hydrogen to the fuel cell stack, determining whether an offset of the hydrogen pressure sensor needs to be corrected based on a stop time before the fuel cell stack starts and a magnitude of an output voltage of the fuel cell stack; calculating an offset correction value when the offset of the hydrogen pressure sensor needs to be corrected, and correcting the offset of the hydrogen pressure sensor and performing the starting of the fuel cell stack.

The checking whether the hydrogen is normally supplied to the fuel cell stack may be performed when the fuel cell stack is requested to start.

In the checking whether the hydrogen is normally supplied to the fuel cell stack, it may be checked whether a pressure of a hydrogen supply line is normal or a hydrogen cut-off valve is open.

In the constantly supplying of the hydrogen to the fuel cell stack, a predetermined amount of hydrogen may be supplied to the fuel cell stack through the control of the hydrogen supply valve.

In the determining whether the offset of the hydrogen pressure sensor needs to be corrected, it may be determined that the offset of the hydrogen pressure sensor needs to be corrected when the stop time before the starting of the fuel cell stack is a reference time or more.

In the determining whether the offset of the hydrogen pressure sensor needs to be corrected, it may be determined that the offset of the hydrogen pressure sensor needs to be corrected when a magnitude of an output voltage is a reference voltage or greater.

In the determining whether the offset of the hydrogen pressure sensor needs to be corrected, it may be determined that the offset of the hydrogen pressure sensor needs to be corrected when a magnitude of an output voltage of the fuel cell stack reaches a reference voltage or greater within a limited time without air being supplied.

The magnitude of the reference voltage may vary according to the stop time before the fuel cell stack starts.

In the calculating of the offset correction value, the offset correction value may be calculated by constantly supplying the hydrogen to the fuel cell stack for a limited time and comparing a value measured by the hydrogen pressure sensor with an initial value.

The offset correction value may be a value obtained by subtracting the measured value from the initial value.

The initial value may vary according to atmospheric pressure during the correction.

In the performing of the starting of the fuel cell stack, a final value may be calculated by reflecting the offset correction value to a value measured by the hydrogen pressure sensor, and the starting of the fuel cell stack may be performed when the final value is a safe value or greater.

According to another embodiment of the present disclosure, a system for correcting an offset of a hydrogen pressure sensor includes a hydrogen supply line that connects between a hydrogen tank and a fuel cell stack, a hydrogen cut-off valve and a hydrogen supply valve that are provided on the hydrogen supply line, a hydrogen pressure sensor that is provided at an inlet end of the hydrogen supply line of the fuel cell stack, and a controller that controls the hydrogen supply valve while the hydrogen cut-off valve is normally opened to constantly supply the hydrogen to the fuel cell stack, determines whether an offset of the hydrogen pressure sensor needs to be corrected based on a stop time before the fuel cell stack starts or a magnitude of an output voltage of the fuel cell stack, corrects the offset of the hydrogen pressure sensor when the offset of the hydrogen pressure sensor needs to be corrected, and performs the starting of the fuel cell stack.

DETAILED DESCRIPTION

Figure 1:
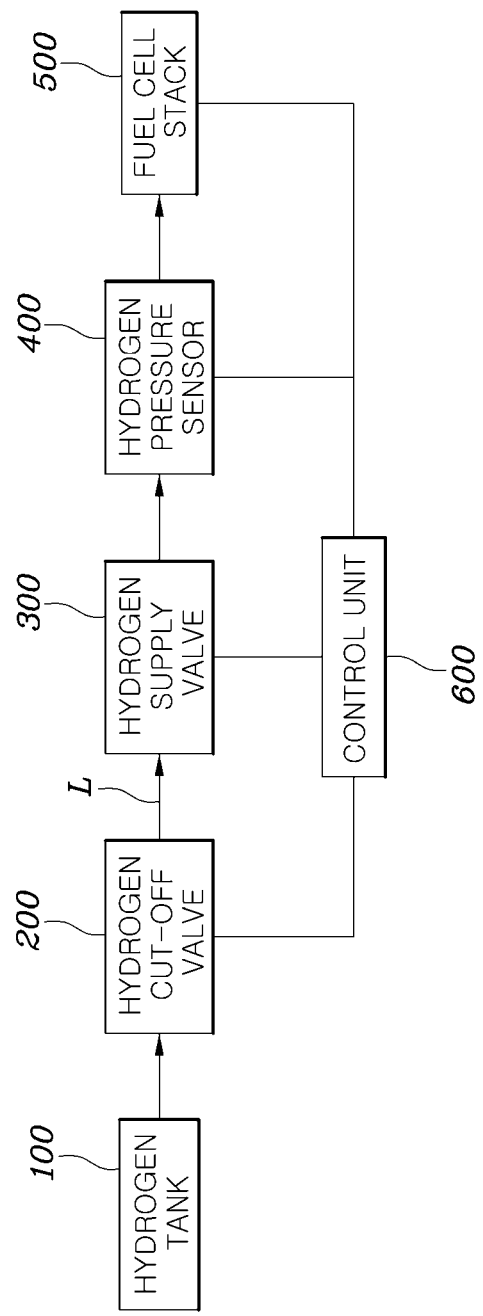
FIG. 1 is a configuration diagram of a system for correcting an offset of a hydrogen pressure sensor according to an embodiment of the present disclosure.
Figure 2:
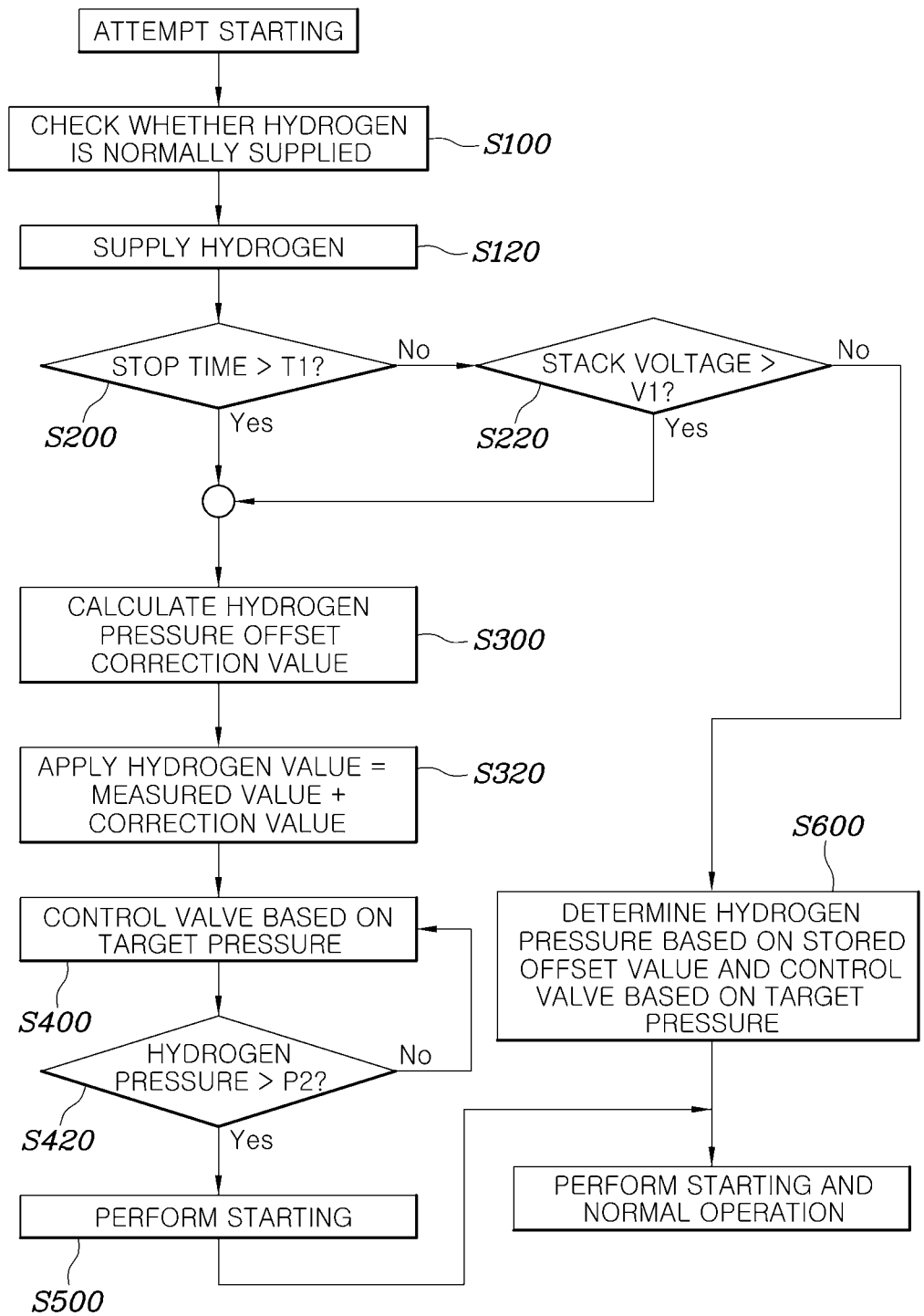
FIG. 2 is a flowchart of a method for correcting an offset of a hydrogen pressure sensor according to an embodiment of the present disclosure.
Figure 3:
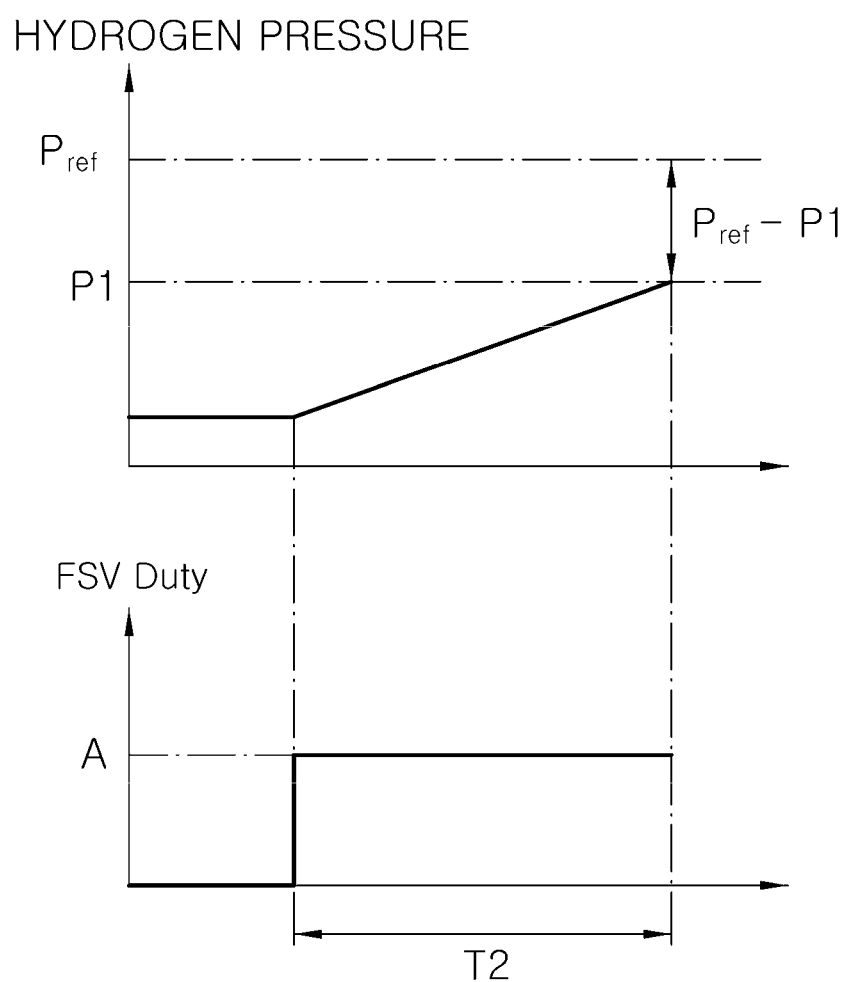
FIG. 3 is a graph of an offset correction value according to the method for correcting an offset of a hydrogen pressure sensor according to the embodiment of the present disclosure.

FIG. 1 is a configuration diagram of a system for correcting an offset of a hydrogen pressure sensor according to an embodiment of the present disclosure, FIG. 2 is a flowchart of a method for correcting an offset of a hydrogen pressure sensor according to an embodiment of the present disclosure, and FIG. 3 is a graph of an offset correction value according to the method for correcting an offset of a hydrogen pressure sensor according to the embodiment of the present disclosure.

FIG. 1 is a configuration diagram of a system for correcting an offset of a hydrogen pressure sensor according to an embodiment of the present disclosure. The system for correcting an offset of a hydrogen pressure sensor according to the present disclosure includes a hydrogen supply line L that connects a hydrogen tank 100 and a fuel cell stack 500, a hydrogen cut-off valve 200 and a hydrogen supply valve 300 that are provided on the hydrogen supply line L, and a hydrogen pressure sensor 400 that is provided at an inlet end of the hydrogen supply line L of the fuel cell stack 500. The system further includes a control unit 600 that controls the hydrogen supply valve 300 while the hydrogen cut-off valve 200 is normally opened to constantly supply the hydrogen to the fuel cell stack 500, determines whether the offset of the hydrogen pressure sensor 400 needs to be corrected based on a stop time before the fuel cell stack 500 starts or a magnitude of an output voltage of the fuel cell stack 500, corrects the offset of the hydrogen pressure sensor 400 when the offset of the hydrogen pressure sensor 400 needs to be corrected, and performs the starting of the fuel cell stack 500.

Here, the control unit 600 according to the embodiment of the present disclosure may be implemented through a non-volatile memory (not illustrated) configured to store an algorithm configured to control operations of various components of the vehicle or data on software instructions reproducing the algorithm and a processor (not illustrated) configured to perform operations to be described below using the data stored in the non-volatile memory. Here, the memory and the processor may be implemented as individual chips. Alternatively, the memory and the processor may be implemented as a single chip integrated with each other, and the processor may take the form of one or more processors.

The present disclosure accurately corrects the offset value of the hydrogen pressure sensor 400 used in a vehicle or an industrial fuel cell system. To this end, the present disclosure should be able to determine the probability of excessive offset of the hydrogen pressure sensor 400, such as a long term neglect of the hydrogen pressure sensor 400 upon starting, calculate the offset of the hydrogen pressure sensor 400 without opening a drain valve upon the starting, satisfy hydrogen emission regulations, and eliminate an excessive problem of the starting time. Therefore, a main object of the present disclosure is to eliminate the risk of occurrence of the reverse voltage upon the starting by the application of the calculated offset value, improve durability, secure accuracy of hydrogen control by normal starting and operation, and secure stability of the system.

Therefore, a control method is disclosed that enables calculation even at the starting in the offset function of the hydrogen pressure sensor 400 of the existing drain valve opening method which may be performed only during shutdown, and enables offset calculation without an operation such as opening the drain valve.

To this end, as illustrated in FIG. 1, the hydrogen supply line L connecting the hydrogen tank 100 and the fuel cell stack 500 is provided in the system for correcting an offset of a hydrogen pressure sensor according to the present disclosure. In addition, the hydrogen cut-off valve 200 and the hydrogen supply valve 300 are provided on the hydrogen supply line L, and the hydrogen pressure sensor 400 is provided at the inlet end of the hydrogen supply line L of the fuel cell stack 500.

Meanwhile, in the case of the hydrogen pressure sensor 400, the offset needs to be changed, and therefore the control unit 600 performs this. First, when the starting is requested, the control unit 600 controls the hydrogen supply valve 300 while the hydrogen cut-off valve 200 is normally opened. In addition, hydrogen is constantly supplied to the fuel cell stack 500, and it is determined that the offset of the hydrogen pressure sensor 400 needs to be corrected based on the stop time before the starting of the fuel cell stack 500 or the magnitude of the output voltage of the fuel cell stack 500. Thereafter, when the offset of the hydrogen pressure sensor 400 needs to be corrected, the offset of the hydrogen pressure sensor 400 is corrected and the fuel cell stack 500 starts.

In particular, in the case of the control unit 600, when the stop time before the starting of the fuel cell stack 500 is excessive, it may be determined that the offset value of the hydrogen pressure sensor 400 needs to be corrected. In addition, it is possible to determine whether the offset value of the hydrogen pressure sensor 400 needs to be corrected based on the magnitude of the output voltage of the fuel cell stack 500 while the hydrogen is constantly supplied.

In general, an offset occurs in the hydrogen pressure sensor 400 due to the introduction of oxygen into the hydrogen electrode due to long term neglect of the fuel cell system. This phenomenon occurs in situations such as the long term neglect after shutdown. Therefore, if the stop time information after the starting stops may be known by the controller or other communication methods, the hydrogen pressure offset correction is performed when the stop time occurs for a certain time or more. In addition, it may be determined whether or not air introduced after the starting stops affects the hydrogen pressure sensor for a long period of time according to whether the voltage is formed before the supply of air after the supply of hydrogen.

Therefore, even if the stop time is not longer than the excessive time, it is possible to determine whether the hydrogen pressure sensor 400 needs to be corrected by determining whether a voltage is formed after the supply of hydrogen. In fact, in various situations in which the controller may not know the stop time information, a method of determining whether the offset of the hydrogen pressure sensor 400 needs to be corrected based on whether the voltage is formed after the supply of hydrogen may be usefully utilized.

In this case, the reference voltage may be applied variably according to the stop time. For example, it is also possible to actively perform the offset correction by applying a low reference voltage even if a time is a certain time or less.

Specifically, FIG. 2 is a flowchart of a method for correcting an offset of a hydrogen pressure sensor according to an embodiment of the present disclosure. The method for correcting an offset of a hydrogen pressure sensor according to the present disclosure includes checking whether hydrogen is normally supplied to a fuel cell stack at S100, constantly supplying the hydrogen to the fuel cell stack at S120, determining whether the offset of the hydrogen pressure sensor needs to be corrected based on a stop time before the fuel cell stack starts and a magnitude of an output voltage of the fuel cell stack at S200 and S220, calculating an offset correction value when the offset of the hydrogen pressure sensor needs to be corrected at S300, and correcting the offset of the hydrogen pressure sensor and performing the starting of the fuel cell stack at S500.

First, the step S100 of checking whether the hydrogen is normally supplied to the fuel cell stack may be performed when the starting of the fuel cell stack is requested. In general, this is because there is a need to change the offset after the stop for a long period of time.

The step S100 of checking whether hydrogen is normally supplied to the fuel cell stack upon the starting is performed. In the step of checking whether the hydrogen is normally supplied to the fuel cell stack, it is possible to check whether the pressure in the hydrogen supply line is normal or whether the hydrogen cut-off valve is opened. This is because it is possible to supply hydrogen and check the voltage when the hydrogen is normally supplied.

In this case, it is a step of checking whether the preconditions for supplying hydrogen from the hydrogen tank to the stack are properly satisfied by checking that the pressure in the line is normally input and the hydrogen cut-off valve (FBV) is opened. This is a general process for the hydrogen supply control because the principle of supplying hydrogen to the stack is a method of controlling the duty of the hydrogen supply valve by forming a differential pressure at the front and rear ends of the hydrogen supply valve.

Thereafter, the step S120 of constantly supplying the hydrogen to the fuel cell stack is performed. In the step S120 of constantly supplying the hydrogen to the fuel cell stack, a certain amount of hydrogen may be supplied to the fuel cell stack through the control of the hydrogen supply valve. This step is a step of constantly supplying the hydrogen to the stack, which has the advantage of avoiding excessive pressure fluctuations and supplying the constant hydrogen for the subsequent calculation of the hydrogen pressure offset value. Through this method, it is possible to avoid the unnecessary offset correction while securing the improved accuracy compared to the related art.

The steps S200 and S220 of determining whether the offset of the hydrogen pressure sensor needs to be corrected based on the stop time before the fuel cell stack starts and the magnitude of the output voltage of the fuel cell stack are performed. In this step, there is a need to determine the correction of the hydrogen pressure offset by using the stop time standard and the stack voltage information by the hydrogen supply before the supply of air.

In general, the case in which the offset of the hydrogen pressure sensor needs to be corrected occurs due to the introduction of oxygen into the hydrogen electrode due to the long term neglect in the stop state. Therefore, in the step of determining whether the offset needs to be corrected, if the stop time before the starting of the fuel cell stack is more than the reference time, it may be determined that the offset of the hydrogen pressure sensor needs to be corrected.

That is, if the stop time (holding time after the start stops) information may be known by the controller or other communication methods, when the stop time is the reference time or more, the hydrogen pressure offset correction is performed. In this case, the reference time may be calculated by estimating the amount of air introduced experimentally or theoretically.

In addition, it may be determined whether or not air introduced after the starting stops affects the hydrogen pressure sensor for a long period time according to whether the voltage is generated before the supply of air after the supply of the hydrogen. Therefore, in the step of determining whether the offset needs to be corrected, if the magnitude of the output voltage of the fuel cell stack is the reference voltage or greater, it may be determined that the offset of the hydrogen pressure sensor needs to be corrected.

Even if the stop time is not the reference time, it is possible to determine whether the hydrogen pressure sensor needs to be corrected by determining whether the voltage is formed after the supply of hydrogen. In fact, in various situations in which the controller may not know the stop time information, a method of determining whether the offset of the hydrogen pressure sensor needs to be corrected based on whether the voltage is formed after the supply of hydrogen may be very usefully utilized.

The voltage standard may be applied variably depending on the stop time. For example, even if the time is the reference time or less but is a certain time or more, it is possible to apply a low reference voltage value to actively perform the offset correction. That is, the magnitude of the reference voltage may vary according to the stop time before the fuel cell stack starts.

In addition, in the step of determining whether the offset needs to be corrected, if the magnitude of the output voltage of the fuel cell stack reaches the reference voltage or greater within the limited time while the air is not supplied, it may be determined that the offset of the hydrogen pressure sensor needs to be corrected.

That is, when determining the voltage condition, the hydrogen supply time is limited in order to prevent the starting time from being excessively prolonged by determining the voltage condition. In fact, even with a small amount of hydrogen supply, the high potential in the stack may be monitored, so the limited time may be set to be short.

When both the stop time condition and the voltage condition are not satisfied, the hydrogen pressure control is normally performed using the previously stored offset value at step S600.

Thereafter, when the offset of the hydrogen pressure sensor needs to be corrected, the step S300 of calculating an offset correction value is performed. In the step S300 of calculating the offset correction value, the hydrogen may be constantly supplied to the fuel cell stack for the limited time and the value measured by the hydrogen pressure sensor may be compared with the initial value to calculate the offset correction value. Specifically, the offset correction value may be a value obtained by subtracting the measured value from the initial value. In addition, the initial value may vary according to the atmospheric pressure during the correction.

FIG. 3 is a graph of the offset correction value according to the method for correcting an offset of a hydrogen pressure sensor according to the embodiment of the present disclosure, and the embodiment of calculating the hydrogen pressure offset correction value may be schematically illustrated as in FIG. 3.

With a fixed duty of the hydrogen supply valve, a certain amount of hydrogen may be supplied when controlled for time T2, and in the case of the normal hydrogen pressure sensor, that is, when there is no hydrogen pressure sensor offset, the pressure to be reached may be calculated experimentally or theoretically with an initial value $P_{ref}$. In addition, the difference between the initial value $P_{ref}$ and the measured value P1 is calculated through the pressure value P1 after the hydrogen supply time T2, and an offset correction value according to the difference is calculated.

If an offset in the (−) direction occurs, the measured value has a value less than the initial value, so the initial value-measured value has a (+) value, and the offset correction value has a (+) value. Conversely, the offset in the (+) direction has an initial value-measured value which is (−), and the offset correction value has a (−) value.

At this time, in order to improve the accuracy, the initial value may be determined as follows using the currently measured atmospheric pressure from the original initial value determined at normal pressure (1 ATM).

Initial value=original initial value−(current atmospheric pressure−1 ATM)

If there is no correction process for such an initial value, it is impossible to respond to a change in atmospheric pressure, and an excessive offset may occur in a situation such as a notice.

Thereafter, the step S500 of correcting the offset of the hydrogen pressure sensor and starting the fuel cell stack is performed. Using the offset correction value calculated in this way, the hydrogen pressure may be calculated by adding the offset correction value from the sensor measured value. The hydrogen supply control, that is, the target pressure-based hydrogen supply valve control is performed based on the calculated hydrogen pressure at S400.

In the step of starting the fuel cell stack, a final value may be calculated by reflecting the offset correction value to the measured value measured by the hydrogen pressure sensor, and when the final value is the safe value or greater, the fuel cell stack may start at S420. That is, based on the determined hydrogen pressure, starting COD is performed when necessary. In this case, the hydrogen pressure inside the stack is performed when it is greater than a safe value P2 based on the corrected value. Through this process, it is possible to prevent the occurrence of the reverse voltage due to the lack of hydrogen during the starting COD.

According to the method and system for correcting an offset of a hydrogen pressure sensor of the present disclosure, it is possible to determine the probability of the excessive offset of the hydrogen pressure sensor such as the long term neglect of the hydrogen pressure sensor upon starting the fuel cell system, calculate the offset of the hydrogen pressure sensor without opening the drain valve upon starting the fuel cell system, satisfy the hydrogen emission regulations and eliminate the problem of the excessive starting time, eliminate the risk of occurrence of the reverse voltage upon starting the fuel cell system by applying the calculated offset, improving the durability, secure the accuracy of the hydrogen control by the normal starting and operation, and secure the stability of the system.

Although the present disclosure has been shown and described with respect to specific embodiments, it will be apparent to those having ordinary skill in the art that the present disclosure may be variously modified and altered without departing from the spirit and scope of the present disclosure as defined by the following claims.

The invention claimed is:

1. A method for correcting an offset of a hydrogen pressure sensor, comprising:
    checking, by a control unit, whether hydrogen is normally supplied to a fuel cell stack;
    constantly supplying the hydrogen to the fuel cell stack;
    determining whether an offset of the hydrogen pressure sensor needs to be corrected based on a stop time before the fuel cell stack starts and a magnitude of an output voltage of the fuel cell stack;
    calculating an offset correction value when the offset of the hydrogen pressure sensor needs to be corrected; and
    correcting the offset of the hydrogen pressure sensor and starting the fuel cell stack;
    wherein in the step of determining whether the offset of the hydrogen pressure sensor needs to be corrected, it is determined that the offset of the hydrogen pressure sensor needs to be corrected when the stop time before the starting of the fuel cell stack is a predetermined time or more.

2. The method of claim 1, wherein the checking whether the hydrogen is normally supplied to the fuel cell stack is performed when the fuel cell stack is started.

3. The method of claim 1, wherein the checking whether the hydrogen is normally supplied to the fuel cell stack includes checking whether a pressure of a hydrogen supply line is normal or a hydrogen cut-off valve is open.

4. The method of claim 1, wherein in the step of constantly supplying of the hydrogen to the fuel cell stack, a predetermined amount of hydrogen is supplied to the fuel cell stack through the control of the hydrogen supply valve.

5. The method of claim 1, wherein in the step of determining whether the offset of the hydrogen pressure sensor needs to be corrected, it is determined that the offset of the hydrogen pressure sensor needs to be corrected when a magnitude of an output voltage is a reference voltage or greater.

6. The method of claim 1, wherein in the step of the determining whether the offset of the hydrogen pressure sensor needs to be corrected, it is determined that the offset of the hydrogen pressure sensor needs to be corrected when a magnitude of an output voltage of the fuel cell stack reaches a reference voltage or greater within a limited time without air being supplied.

7. The method of claim 6, wherein the magnitude of the reference voltage varies according to the stop time before the fuel cell stack starts.

8. The method of claim 1, wherein in the step of calculating of the offset correction value, the offset correction value is calculated by constantly supplying the hydrogen to the fuel cell stack for a limited time, and comparing a value measured by the hydrogen pressure sensor with an initial value.

9. The method of claim 8, wherein the offset correction value is a value obtained by subtracting the measured value from the initial value.

10. The method of claim 8, wherein the initial value varies according to atmospheric pressure during the correction.

11. A method for correcting an offset of a hydrogen pressure sensor, comprising:
- checking, via a control unit, whether hydrogen is normally supplied to a fuel cell stack;
- constantly supplying the hydrogen to the fuel cell stack;
- determining whether an offset of the hydrogen pressure sensor needs to be corrected based on a stop time before the fuel cell stack starts and a magnitude of an output voltage of the fuel cell stack;
- calculating an offset correction value when the offset of the hydrogen pressure sensor needs to be corrected; and
- correcting the offset of the hydrogen pressure sensor and starting the fuel cell stack;
- wherein in the step of starting the fuel cell stack, a final value is calculated by reflecting the offset correction value to a value measured by the hydrogen pressure sensor, and the starting of the fuel cell stack is performed when the final value is a predetermined value or greater.

* * * * *